Aug. 7, 1962  S. RUBEN  3,048,645
PRIMARY DRY CELL
Filed Jan. 17, 1961

INVENTOR.
SAMUEL RUBEN
BY
ATTORNEY

United States Patent Office 3,048,645
Patented Aug. 7, 1962

3,048,645
PRIMARY DRY CELL
Samuel Ruben, 271 North Ave., New Rochelle, N.Y.
Filed Jan. 17, 1961, Ser. No. 83,333
16 Claims. (Cl. 136—100)

The invention relates to primary cells, and, more particularly, to primary dry cells employing a highly active metal, such as magnesium, as the anode.

The present application is a continuation-in-part of my co-pending application Serial No. 854,790, filed November 23, 1959, now abandoned, for Primary Dry Cell.

The use of magnesium anodes in primary cells has engaged the attention of those skilled in the art for a considerable length of time due to the ready availability, low cost, light weight and high electrochemical potential of this metal. One of the problems that has been inherent to magnesium anode cells was the starting lag, that is, the time required by the cell to come up to operating voltage. Once the cell was put into use by connecting it to a load, the drop in potential at the anode would decrease and the lag would be overcome. However, after discharge was interrupted and the cell was subjected to a period of non-use, the lag would progressively increased and would rise to a greater value. Another problem encountered with magnesium anode cells was that of the generation of gas on shelf due to some local action and particularly gas evolution during operation of the cell, which results in poor efficiency, unsatisfactory shelf life, inconsistency in cell characteristics and electrolyte leakage during discharge, or when exhausted. These problems seriously interfered with the large scale production and use of magnesium anode cells. Although various suggestions and proposals were made to solve the outstanding problem, none of these suggestions and proposals was completely satisfactory or commercially successful.

It is an object of the invention to improve primary cells, specifically primary dry cells having a magnesium anode.

It is another object of the present invention to provide a magnesium anode primary cell which is substantially free from the difficulties and inconveniences outlined in the foregoing.

It is a further object of the invention to provide a novel and improved primary dry cell having a highly active anode, such as one of magnesium, which is substantially free from starting lag, is capable of good shelf life and is free from leakage of electrolyte both during discharge, or when exhausted.

It is also within contemplation of the invention to provide an improved structural organization for primary dry cells comprising novel gas venting means incorporated in the anode.

The invention also contemplates a primary dry cell having a magnesium anode which is simple in construction, reliable and efficient in operation and which may be readily manufactured and sold on a practical and commercial scale at a low cost.

Other and further objects and advantages of the present invention will become apparent from the following description, taken in conjunction with the accompanying drawing, in which.

Figure 1:
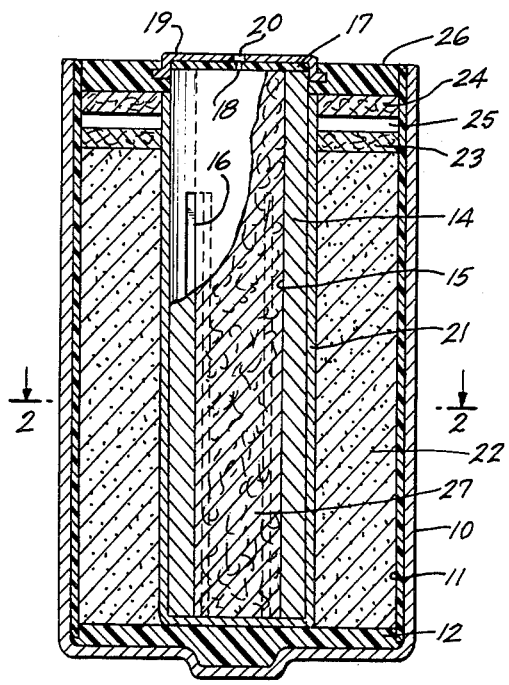
FIG. 1 is a vertical sectional view of a cell embodying the principles of the present invention.

In conventional magnesium cell structures, the anode in the form of a magnesium can or shell constitutes the cell container, the inner surface of which is in direct contact with the spacer layer of paper or other porous material. It has been discovered that in cell structures of this general type, there is an important interrelation between gas evolution and the difficulties heretofore experienced with erratic cell variations and increasing time lag on use and shelf. It has been found that this gas, evolved in accordance with the reaction $$Mg + 2H_2O \rightarrow Mg(OH)_2 + H_2$$

in order to escape from the surface of the magnesium anode, develops a pressure, which forces the electrolyte out of the magnesium oxide layer and of the spacer in direct contact with said anode and thus decreases the conductivity of such layer and spacer to a low value. Another effect of the said pressure is to cause a more dense magnesium hydroxide, or magnesium oxide layer to be produced on the magnesium surface. The result is a large increase in the internal resistance of the cell which may rise from 0.7 ohm to 30 ohms and causes a substantial time lag before the cell will be able to discharge current of the expected magnitude. Upon connection of the cell with the load, the electrolyte flow is toward the anode. However, sufficient time must be allowed for the electrolyte flow to re-wet the porous spacer and the hydroxide or oxide layer on the magnesium before adequate conductivity is reestablished. This will be noted by the rapid decrease in the internal resistance after the cell has been delivering load current for some time.

In accordance with the principles of the invention, the detrimental effect of gas generation can be reduced to a minimum by a structural reorganization of the cell and by incorporation of suitable venting means in the anode. In the preferred embodiment of the invention, this is accomplished by providing a generally tubular anode having apertures, for example in the form of axially extending slots, through the walls thereof, which anode is surrounded by the porous absorbent spacer layer and the depolarizer mix. Thus, the hydrogen gas developed on the interface of anode and mix can escape directly to the atmosphere through the venting path provided by the said apertures or slots and the hollow center of the anode, without displacing electrolyte in the depolarizer bobbin or in the magnesium oxide and spacer layer, as is the case with conventional cell structures. A porous absorbent material may be provided in the hollow center of the anode to absorb any electrolyte that may be carried along by the vented gas.

Various electrochemical systems may be used in the cell of the invention. For lower voltage applications and where the highest ampere hour capacity is desired, the system may be the one disclosed in my U.S. Patent No. 2,948,768 in which the electrolyte is an aqueous sulfamate salt solution having a concentration between 10% and 25%. Although an aqueous magnesium sulfamate solution is the preferred electrolyte, other sulfamate salt solutions may be used which do not contain the ion of a metal having a substantially lower potential than that of magnesium, such as the sulfamates of aluminum, potassium, barium and lithium. A suitable chromate inhibitor in the amount between 0.1% and 3% is added to the electrolyte, such as a soluble chromate or bichromate of lithium, potassium or sodium. The depolarizer is copper oxide to which a smaller amount of finely divided carbon has been added in a proportion which may vary between 4 and 10 parts by weight of copper oxide for 1 part by weight of carbon.

Another cell system, which is preferred for general applications and where the cell is intended as a replacement for conventional magnesium anode cells, utilizes a suitable bromide electrolyte, such as an aqueous magnesium bromide solution, the concentration of which may be between 10% and 30%, containing a chromate inhibitor. The depolarizer is chemically produced manganese dioxide to which a smaller amount of acetylene carbon has been added in a proportion between 4 and 15 parts by weight of manganese dioxide for 1 part by weight of carbon.

The preferred cell container is a can drawn from copper-clad steel sheet which is lined with a layer of electrically conductive plastic to prevent direct contact of the electrolyte with the surface of the can. It is essential that this plastic layer be continuous and free from pinholes to eliminate the possibility of any electrolyte passing therethrough and causing detrimental local action on the inner surface of the can. The anode of the cell may be formed of pure magnesium or of suitable commercial magnesium base alloys, such as an alloy containing 2% aluminum and 1% zinc.

Referring to the drawing illustrating a preferred embodiment of the invention, reference numeral 10 denotes the cell container and positive terminal in the form of a copper-clad steel can, which may be drawn from copper-plated steel sheet. The inner circumferential surface of container 10 is lined with a layer 11 of conductive plastic, such as polyvinyl chloride to which a sufficient amount of acetylene carbon black has been added to make it electrically conducting. A layer 12 of epoxy resin is then poured in liquid form into the bottom of the container and, upon condensation, insulates the bottom surface of the container and also seals the layer of conductive plastic in that region. Conducting layer 11 and insulating layer 12 jointly constitute an electrolyte-impermeable lining for the container.

Figure 2:
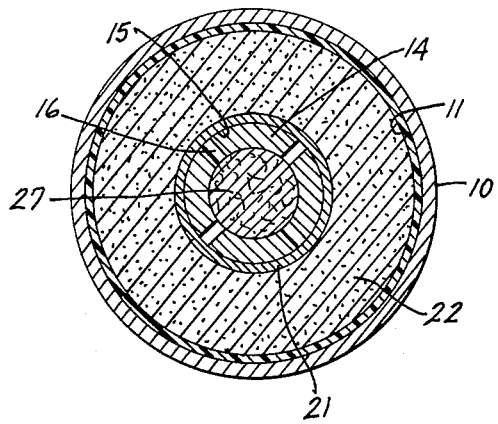
FIG. 2 is a transverse section taken on line 2—2 of FIG. 1.

In the center of container 10 and resting on insulating layer 12, there is provided tubular magnesium anode 14 having an inner space or channel 15 extending axially therethrough. Channel 15 is in communication with the external surface of the anode through radial slots 16 (FIG. 2), which extend axially through the major portion of the length of the anode but terminate below the upper end thereof. A 0.010" thick insulating disc 17 of polyethylene or other suitable plastic is adhesively secured to the top of anode 14 and has a pinhole 18 perforated therein. Over disc 17 and in force-fitted contacting relation with the top end of the anode is a flanged stainless steel cap 19 constituting the negative terminal of the cell and having a venting aperture 20 therein, aligned with pinhole 18 of the underlying disc 17. Anode 14 has a spacer layer 21 of kraft paper or of some other suitable dense, ionically permeable absorbent sheet material wrapped therearound.

Depolarizer bobbin 22 is composed of 12 parts by weight of chemically produced synthetic manganese dioxide and 1 part by weight of Shawinigan carbon black. To the depolarizer dry mix is added a suitable quantity of the electrolyte which may be a 20% solution of magnesium bromide containing a chromate inhibitor, such as 2% of lithium chromate.

The bobbin, which in a standard size "D" cell may weigh about 60 grams, is consolidated against the conductive plastic surface 11 of the copper-clad steel container 10 and also against the anode 14 and the spacer layer 21. An apertured wax-coated fibre washer 23 is forced down on the anode onto the bobbin to keep it under compression. Above this washer, there is provided a similar washer 24, defining with the former an expansion space 25 so as to allow for any expansion that may occur during cell operation. Of course, both of these washers are placed on the anode prior to applying terminal cap 19 onto the upper end of the anode. A body of hard sealing compound 26, such as a suitable wax or an epoxy resin is provided above washer 24 and also partially covers flanged terminal cap 19. In order to avoid any electrolyte loss through the hollow center or inner space 15 of the tubular anode, the said space is preferably filled with absorbent cotton 27. Plastic disc 17 on top of the anode is also instrumental in preventing any discharge of the electrolyte as pinhole 18 will only open under gas pressure and immediately reseals itself after such pressure has been released.

In the operation of the cell, gas generated at the interface of the anode 14 and the spacer 21 will pass through radial slots 16 of the anode into its hollow center 15 and, when of sufficient pressure, through pinhole 18 of flexible plastic disc 17 on the end of the anode and through aperture 20 of cap 19 is released directly into the external atmosphere. As a result of this venting action, there will not be an appreciable increase in internal pressure. The spacer layer 21, the magnesium oxide layer formed on the anode, and the depolarizer bobbin will not be deprived of the necessary electrolyte content by displacement of the electrolyte due to the hydrogen gas flow inherent to magnesium anodes. The internal resistance of the cell will remain within desirable limits during the operation of the cell by maintaining the magnesium oxide layer saturated with electrolyte, thus eliminating the long and progressively increasing time lag in the delivery of current which was characteristic of prior magnesium anode cells.

The cell of the invention may be assembled in the following manner.

An electrically conducting plastic liner is prepared by bending a 0.007" thick plastic sheet around a cylindrical mandrel of appropriate diameter and thermally sealing the edges of the sheet together. The resulting sleeve is then withdrawn from the mandrel, is slipped into the cell container and is secured by a cast insulating bottom layer of an epoxy resin. A depolarizer mix composed of an intimate mixture of manganese dioxide and carbon in the ratio of 12:1 is made into a compressible form by adding 240 cc. of the above described magnesium bromide electrolyte to 400 grams of the dry mix. The bobbin comprising 60 grams of the resulting wet mix is placed in the conductive plastic-lined container and a hole is pierced therethrough, the diameter of which is approximately equal to that of the anode. The anode in the form of a slotted magnesium tube having absorbent cotton in the inner space thereof and a layer of kraft paper wrapper around it, is pushed into the hole in the bobbin. The upper end of the anode carries an insulating plastc disc having a pinhole therein. An apertured wax-coated washer, fitting tightly over the kraft paper covered anode, is placed on the unslotted upper end of the anode and is pushed down by means of a suitably-shaped consolidating tool against the top surface of the bobbin, causing the bobbin to expand against and into firm electrical contact with both the lined container and the wrapped anode. Another wax-coated apertured washer is forced over the said upper end of the anode into a position where its lower face, together with the upper face of the first washer, defines an expansion space and its upper face, together with the end of the lined can, defines a space for pouring the hard wax or epoxy resin seal. Prior to pouring the said seal, the portion of the kraft spacer extending beyond the top or second waxed washer is removed and an apertured, flanged stainless steel terminal cap is force-fitted on the upper end of the anode, a portion of the said cap being subsequently embedded in the seal.

Figure 3:
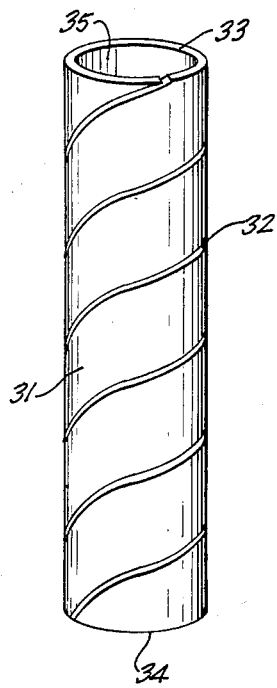
FIG. 3 is a perspective view of a modified anode embodying the invention.

FIG. 3 illustrates a modified anode suitable for the purposes of the invention. This anode comprises a thick strip 31 of anode metal spirally wound into a tubular structure so as to have a small spiral gap 32 between adjacent edges of the strip. The ends of the resulting tube are cut off at both ends in planes which are at right angles to the axis, as this is indicated at 33 and 34. In this modified construction, gap 32 provides communication between the outer surface and inner space 35 of the anode. In a practical form of this anode, the thickness of the metal strip was 0.080", its width 0.500" and the gap between adjacent turns was 0.020". The length of the tubular anode and its diameter would, of course, depend on the dimensions of the cell for which the anode is intended. This form of construction has the advantage of low cost as it can be readily manufactured from strip stock by means of a simple process.

Although the venting anode of the invention has been disclosed as specifically applied to a magnesium-magnesium bromide-manganese dioxide and to a magnesium-magnesium sulfamate-copper oxide cell system, it can be advantageously used for various other electrochemical cell systems comprising other active anode metals, electrolytes, or depolarizers. Thus, the principles of the invention are applicable to cells employing an aluminum anode in combination with suitable depolarizers, such as manganese dioxide, and with compatible electrolytes, such as aqueous solutions of manganous chloride and aluminum chloride. Also, it will be readily understood that instead of elongated radial slots, or of a spiral slot, apertures of other widely different shapes and arrangements may be provided in the walls of the anode to establish communication between the outer surface and the inner space thereof.

What is claimed is:

1. A primary dry cell in condition ready for the instantaneous delivery of an electric current to a load comprising a container open at one end, a magnesium anode in said container having a porous spacer layer therearound, cathode depolarizer mix compacted in and substantially completely filling out the interspace between said spacer layer and the inner surface of said container with one end of the anode extending therefrom, an electrolyte absorbed in said spacer layer and in said mix, closure means for the open end of said container, and electrical terminal means for said anode and for said cathode depolarizer mix, said anode having a venting channel extending longitudinally therethrough and through said closure means into the atmosphere and also having apertures connecting said channel to the electrochemically active spacer-carrying surface of the anode whereby gas produced at the active anode surface may be vented into the atmosphere through said apertures and said channel.

2. A primary dry cell in condition ready for the instantaneous delivery of an electric current to a load comprising an imperforate container open at one end, at least the inner surface of said container comprising carbonaceous material in an amount sufficient to make it electrically conducting, a magnesium anode in said container, a porous spacer layer surrounding said anode, a body of compacted cathode depolarizer mix interposed between and in contact with said spacer layer and the inner surface of said container and substantially completely filling out the interspace therebetween, an electrolyte absorbed in said spacer layer and in said mix, and closure means for the open end of said container, said anode having a venting channel extending longitudinally therethrough and through said closure means into the atmosphere and also having apertures connecting said channel to the electrochemically active spacer-carrying surface of the anode whereby gas produced at the active anode surface may be vented into the atmosphere through said apertures and said channel.

3. A primary dry cell comprising an imperforate container of electrically conducting material open at one end, an anode selected from the group consisting of magnesium and aluminum in said container in spaced relation from the walls thereof, a porous spacer layer around said anode, a body of cathode depolarizer compacted in and substantially completely filling out the interspace between said spacer layer and the inner surface of said container, and an electrolyte impregnating said depolarizer and said spacer layer, said anode having a channel extending therethrough in communication with its outer surface and venting into the atmosphere at the open end of said container.

4. A primary dry cell comprising an imperforate container of electrically conducting material open at one end, a magnesium anode in said container in spaced relation from the walls thereof, a porous spacer layer around said anode, a body of cathode depolarizer compacted in and substantially completely filling out the interspace between the inner surface of said container and the outer surface of said space layer, said anode having a venting channel extending therethrough into the atmosphere at the open end of said container and having apertures through which the boundary surface of depolarizer and anode is in communication with said channel.

5. A primary dry cell comprising a container of electrically conducting material open at one end, a magnesium anode in the center of said container and spaced from the walls thereof, a porous spacer layer surrounding said anode, a body of cathode depolarizer mix compacted in and substantially completely filling out the interspace between said spacer layer and the inner surface of said container and in electrical contact therewith, and an electrolyte impregnating said spacer layer and said mix, said anode having a venting channel extending longitudinally therethrough which opens into the atmosphere at the open end of said container and also having apertures in its wall connecting said channel to the spacer-carrying surface of the anode whereby gas produced at said anode surface is vented into the atmosphere through said apertures and said channel.

6. A primary dry cell comprising a container of electrically conducting material open at one end, a body of cathode depolarizer mix compacted in said container and in electrical contact with the inner surface thereof, a generally tubular magnesium anode having a porous spacer layer therearound embedded in said mix, said mix substantially completely filling out the interspace between said container and said layer, and an electrolyte impregnating said mix and said spacer layer, said anode having its inner space opening into the atmosphere at the open end of said container and having openings through the wall thereof defining with said inner space of the anode a venting path for releasing gas produced at the outer surface of the anode into the atmosphere.

7. A primary dry cell comprising an imperforate container of electrically conducting material open at its top, a body of cathode depolarizer mix compacted in said container and in electrical contact with the inner surface thereof, a tubular magnesium anode having a porous spacer layer therearound embedded in said compacted mix and also having longitudinally extending slots in the embedded portion thereof, said mix substantially completely filling out the interspace between said container and said spacer layer, top closure means for said container through which the end of said anode extends, and an electrolyte impregnating said mix and said spacer layer, said slots together with the inner space of said anode defining a venting path for releasing gas produced at the outer surface of the anode into the atmosphere at the open end of said container.

8. A primary dry cell comprising an imperforate container of electrically conducting material open at its top, a body of cathode depolarizer mix compacted in said container and in electrical connection with the inner surface thereof, a tubular magnesium anode having a porous spacer layer therearound embedded in said mix, said anode comprising a magnesium strip spirally wound into a tube with a gap between adjacent edges of the strip, said mix substantially completely filling out the interspace between said container and said spacer layer, top closure means for said container through which the end of said anode extends, and an electrolyte impregnating said mix and said spacer layer, said gap and the inner space of the anode defining a venting path for releasing gas produced at the outer surface of the anode into the atmosphere at the open end of said container.

9. A primary dry cell comprising an imperforate metal container open at one end, a layer of electrically conducting plastic on the inner circumferential surface of said container, an insulating layer in the bottom of said container and together with said conducting layer constituting an electrolyte-impermeable lining for said container, a body of cathode depolarizer mix compacted in said container and in pressure contact with said conducting plastic layer, closure means for the open end of said container, a generally tubular magnesium anode having its major portion embedded in said mix with its inner space in communication with the atmosphere through said closure means, a porous spacer layer around said anode, said mix substantially completely filling out the interspace between said container and said spacer layer, and an electrolyte impregnating said mix and said spacer layer, the embedded portion of said anode having openings through the wall thereof defining with said inner space of the anode a venting path from the anode surface to the atmosphere at the open end of said container.

10. A primary dry cell comprising an imperforate metal container open at its top, a body of cathode depolarizer mix compacted in said container and in electrical pressure contact with the inner surface thereof, a generally tubular magnesium anode with a porous spacer layer therearound having its major portion embedded in said mix and one of its ends extending therefrom, a member for sealing said end of the anode and having valve means incorporated therein, said mix substantially completely filling out the interspace between said container and said spacer layer, top closure means for said container, and an electrolyte impregnating said mix and said spacer layer, said anode having its inner space opening into the atmosphere through said valve means and through said top closure means and having openings in the wall thereof defining with said inner space of the anode and with said valve means a venting path for releasing gas produced at the active surface of the anode into the atmosphere.

11. The primary dry cell according to claim 10 in which the inner space is filled with an absorbent material.

12. A primary dry cell comprising an imperforate metal container open at one end, a layer of electrically conducting plastic on the inner circumferential surface of said container, an insulating layer in the bottom of said container and together with said conducting layer constituting an electrolyte-impermeable lining for said container, a body of cathode depolarizer mix compacted in said container and in pressure contact with said conducting plastic layer, closure means for said open end of the container, a magnesium anode with an axial channel therethrough having its major portion embedded in said mix and one end extending from the mix, a spacer layer around said anode, said mix substantially completely filling out the interspace between said conducting plastic layer and said spacer layer, an elastic membrane having a pinhole therein normally sealing said end of said channel and capable of venting gas therefrom upon slight increase of internal pressure, an apertured terminal cap on said end of the anode and superposed on said membrane with its aperture exposed to the exterior through said closure means, and an electrolyte impregnating said mix and said spacer layer, said anode having its channel in restricted communication with the atmosphere through said pinhole and having apertures in the wall thereof defining with said channel and pinhole a venting path whereby upon slight increase in the internal pressure gas produced at the electrochemically active surface of the anode is released into the atmosphere.

13. A primary dry cell comprising an imperforate container of electrically conducting material, a body of cathode depolarizer mix compacted in said container and conductively connected to the inner surface thereof, a magnesium anode rod having a hollow center embedded in said mix and extending therefrom at one of its ends with its hollow center in communication with the atmosphere, a porous spacer layer around said anode, said mix comprising copper oxide and carbon and substantially completely filling out the interspace between said spacer layer and the inner surface of said container, and an aqueous sulfamate salt electrolyte impregnating said mix and said spacer layer, said anode having openings through the wall thereof defining with the hollow center of the anode a venting path from the active anode surface to the atmosphere.

14. A primary dry cell claimed in claim 13 wherein the inner surface of the container is formed of copper and the circumferential portion of said surface is lined with an electrically conducting plastic.

15. A primary dry cell comprising an imperforate container of electrically conducting material, a body of cathode depolarizer mix comprising manganese dioxide and carbon compacted in said container, a magnesium anode rod having a hollow center embedded in said mix and extending therefrom at one of its ends with its hollow center in communication with the atmosphere, a porous spacer layer around said anode, said mix substantially completely filling out the interspace between said spacer layer and the inner surface of said container, and an aqueous magnesium bromide electrolyte impregnating said mix and said spacer layer, said anode having openings through the wall thereof defining with the hollow center of the anode a venting path from the active anode surface to the atmosphere.

16. The primary dry cell claimed in claim 15 wherein the inner surface of the container is formed of copper and the circumferential portion of said surface is lined with an electrically conducting plastic.

References Cited in the file of this patent
UNITED STATES PATENTS

| | | |
|---|---|---|
| 741,675 | Kennedy | Oct. 20, 1903 |
| 2,050,172 | Gordon | Aug. 4, 1936 |
| 2,822,416 | Parkinson | Feb. 4, 1958 |